J. CHILCOTT.
PREPARING GRAIN FOR DISTILLATION.
No. 47,394.
Patented Apr. 25, 1865.
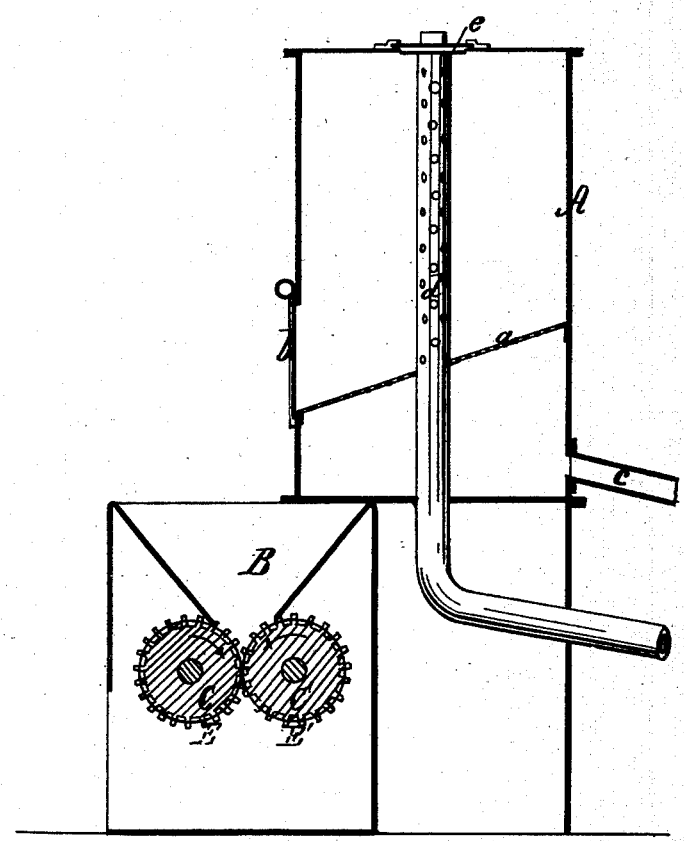

UNITED STATES PATENT OFFICE.

JOHN CHILCOTT, OF BROOKLYN, NEW YORK.

IMPROVED PROCESS FOR PREPARING GRAIN FOR DISTILLATION.

Specification forming part of Letters Patent No. 47,394, dated April 25, 1865; antedated April 15, 1865.

*To all whom it may concern:*

Be it known that I, JOHN CHILCOTT, of No. 70 Fulton street, in the city of Brooklyn, in the county of Kings and State of New York, have invented a new and useful Improvement in Preparing Grain for Distillation; and I do hereby declare that the following is a full, clear, and exact description of the same, reference being had to the accompanying drawing, forming part of this specification, said drawing representing a vertical section of an apparatus which may be used in carrying on my invention.

The object of my invention is to prepare grain, more especially corn, for distillation in such a manner as to enable it to form a more intimate mixture with the water in the mash-tub; and to this end it consists in first subjecting the grain to the action of steam, which saturates and swells it and bursts the skin, and afterward passing it between rollers and crushing it to a pulp.

To enable others to prepare grain for distillation according to my invention, I will proceed to describe the same with reference to the drawing.

A is a tight vessel, of a convenient size, provided with a strainer, $a$. On top of said vessel is a man-hole, $e$, through which the corn is placed into the vessel fitted with a steam-tight lid.

$d$ is a perforated central pipe, through which steam is admitted into the vessel A.

$b$ is a door so situated as to allow the corn to pass out of the vessel A into the hopper B and between the rollers C C'. These rollers may be made hollow and heated by steam, and are set in motion by gears E E'.

$c$ is a pipe which carries off the water of condensation passing through the strainer $a$.

The operation is as follows: Corn or other grain, being placed into the vessel A through the opening $e$, is subjected to the action of steam admitted through the perforated pipe $d$. The steam saturates and swells the corn and bursts the skin, thus separating the latter from the inside. When it is steamed long enough to become very soft, the grain is let out through the door $b$ into the hopper B, from which it passes between two rollers, C C', and is thereby thoroughly crushed to a pulp, which will readily mix with water, when it is introduced into the mash-tub. Corn thus prepared for distillation is far superior to when prepared in the old way of grinding the same, as the skin being entirely separated allows the interior of the grain to be brought to a soft pulpy state and mixed very intimately with the water in the mash-tub, giving a greater yield of spirit.

What I claim as my invention, and desire to secure by Letters Patent, is—

1. The process of preparing grain for distillation by steaming and crushing it between rollers, substantially as herein described.

2. The combination of the steaming-vessel A, perforated pipe $d$, hopper B, and rollers C C', substantially as and for the purpose set forth.

JOHN CHILCOTT.

Witnesses:
HIPPOLYTE MALI,
HENRY T. BROWN.